(12) United States Patent
Kropp

(10) Patent No.: US 6,385,374 B2
(45) Date of Patent: May 7, 2002

(54) MULTICHANNEL ELECTRO-OPTICAL ASSEMBLY

(75) Inventor: Jörg-Reinhardt Kropp, Berlin (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/900,668

(22) Filed: Jul. 6, 2001

Related U.S. Application Data

(63) Continuation of application No. PCT/DE00/00091, filed on Jan. 6, 2000.

(30) Foreign Application Priority Data

Jan. 6, 1999 (DE) .......................... 199 00 695

(51) Int. Cl.⁷ .............................. G02B 6/28; G02B 6/32
(52) U.S. Cl. ........................... 385/47; 385/24; 359/131
(58) Field of Search ...................... 385/16–24, 31–36, 385/39, 42, 47; 359/124–131

(56) References Cited

U.S. PATENT DOCUMENTS

| | | | |
|---|---|---|---|
| 4,701,010 A | | 10/1987 | Roberts |
| 4,701,012 A | * | 10/1987 | Kaiser .......................... 359/128 |
| 5,408,559 A | * | 4/1995 | Takahashi et al. ............. 385/89 |
| 5,416,624 A | | 5/1995 | Karstensen |
| 5,894,535 A | * | 4/1999 | Lemoff et al. ................. 385/47 |
| 6,031,952 A | * | 2/2000 | Lee .............................. 385/47 |
| 6,198,864 B1 | * | 3/2001 | Lemoff et al. ................. 385/47 |
| 6,201,908 B1 | * | 3/2001 | Grann .......................... 385/24 |

FOREIGN PATENT DOCUMENTS

| | | |
|---|---|---|
| DE | 28 51 625 C2 | 9/1988 |
| DE | 39 29 480 A1 | 3/1991 |
| DE | 44 16 717 C1 | 12/1995 |
| EP | 0 826 995 A1 | 3/1998 |
| EP | 0 844 503 A1 * | 5/1998 |

OTHER PUBLICATIONS

T. Nagahori et al.: "1–Gbyte/sec Array Transmitter and Receiver Modules for Low–cost Optical Fiber Interconnection", IEEE 1996 Electronic Components and Technology Conference, pp. 255–258.

* cited by examiner

*Primary Examiner*—Akm E. Ullah
*Assistant Examiner*—Michelle R. Connelly-Cushwa
(74) *Attorney, Agent, or Firm*—Laurence A. Greenberg; Werner H. Stemer; Gregory L. Mayback

(57) ABSTRACT

A component contains a first array with a plurality of electro-optical converters for electro-optically converting a first light wavelength. Each of the electro-optical converters is optically coupled to a respective assigned wave guide. The aim of the invention is to increase the transmission capacity of such a component. To this end, a second row with additional electro-optical converters is provided which is configured to convert a second light wavelength that is different from the first light wavelength. One of these additional electro-optical converters each is optically coupled to one of the plurality of wave guides.

5 Claims, 2 Drawing Sheets

MULTICHANNEL ELECTRO-OPTICAL ASSEMBLY

CROSS-REFERENCE TO RELATED APPLICATION

This application is a continuation of copending International Application No. PCT/DE00/00091, filed Jan. 6, 2000, which designated the United States.

BACKGROUND OF THE INVENTION

Field of the Invention

The invention relates to a multichannel electro-optical assembly containing a first array of electro-optical transducers for electro-optical conversion of radiation having a first light wavelength and at least one further array of electro-optical transducers for electro-optical conversion of radiation having at least one second light wavelength different from the first light wavelength. A plurality of optical waveguides and a deflection device for optically coupling in each case an electro-optical transducer of the first array and of the further array, on one side, and an optical waveguide, on the other side, are provided. It lies in the field of electro-optical data transmission, in which electrical information converted into optical signals (e.g. infrared light signals) by a transmitter passes via a suitable optical waveguide to an optical receiver. The receiver converts the received signals back into electrical signals. Such transmitters and receivers are hereinafter generally also designated as electro-optical transducers.

Thus, in the context of the present invention, a transducer is to be understood as an assembly which, given corresponding electrical driving, outputs (transmitter) an optical signal (radiation) or, upon application of an optical signal, generates (receiver) a corresponding electrical signal. The actual electro-optical signal conversion takes place in a radiation-emitting region or a radiation-sensitive region. These regions or areas are generally also designated as optically active zones. Examples of suitable transducers are laser diodes or photodiodes.

In the context of the invention, an optical waveguide is to be understood as any element suitable for the spatially delimited, guided forwarding of an optical signal, e.g. prefabricated optical waveguides which can be combined in a parallel fashion in a so-called optical waveguide rhythm.

An assembly of the generic type is described in U.S. Pat. No. 5,416,624. The assembly has a transmitting array and a receiving array of electro-optical transducers that are coupled via a deflection device with optical waveguides. In this case, the deflection device has a configuration of wave-selectively coated lenses which have the effect that radiation of a first wavelength is coupled from the transmitting array into the optical waveguides and radiation of a second wavelength which is coupled out from the optical waveguides is conducted onto a receiving array.

The paper "1-Gbyte/sec array transmitter and receiver modules for low-cost optical fiber interconnection" by T. Nagahori et al. from 1996 IEEE, Electronic Components and Technology Conference, pages 255 to 258, describes an assembly having a plurality of electro-optical transducers configured as optical receivers. Each receiver is assigned to an optical waveguide end of a multichannel optical waveguide rhythm ("optical fiber array"). The radiation-sensitive region of each transducer is optically coupled via a mirror to the light-guiding core of the respective optical waveguide. The sensitivity of the transducers is limited to a single specific light wavelength that is transmitted by the optical waveguides.

Optical data transmission technology is increasingly required to increase the data transmission capacity while simultaneously reducing and simplifying the individual components and minimizing the structural space required. This has led in particular to the development of multichannel transmission systems.

SUMMARY OF THE INVENTION

It is accordingly an object of the invention to provide a multichannel electro-optical assembly which overcomes the above-mentioned disadvantages of the prior art devices of this general type, which significantly increases the transmission capacity of the multichannel electro-optical assembly in the simplest manner without increasing the structural space.

With the foregoing and other objects in view there is provided, in accordance with the invention, a multichannel electro-optical assembly. The assembly contains a first array having electro-optical transducers for electro-optical conversion of radiation with a first light wavelength and at least one second array having electro-optical transducers for electro-optical conversion of radiation having at least one second light wavelength being different from the first light wavelength. The at least one second array is disposed parallel to the first array. A plurality of optical waveguides are provided. A deflection device for optically coupling in each case one of the electro-optical transducers of the first array and of the at least one second array to one of the optical waveguides. The deflection device has at least two reflecting surfaces disposed parallel to one another and each of the two reflecting surfaces is associated respectively with one of the first array and the at least one second array so that into each of the optical waveguides the radiation of the first wavelength and the radiation of the second wavelength is able to be coupled in or out or radiation of the first wavelength is coupled in and radiation of the second wavelength is coupled out.

Accordingly, it is provided that at least two arrays of electro-optical transducers are disposed parallel to one another and the deflection device has at least two reflecting surfaces which are disposed parallel and are respectively assigned to an array. The effect thereby achieved is that, into each optical waveguide, radiation of the first wavelength and radiation of the second wavelength is coupled in or out or radiation of the first wavelength is coupled in and radiation of the second wavelength is coupled out.

An essential advantage of the assembly according to the invention is that, by virtue of the transmission with different light wavelengths, which is superposed on a plurality of parallel, physically separate channels (wavelength division multiplex), quite a considerable increase in the transmission capacity can be realized without resulting in an increase in the requisite structural space or the requisite number of transmission channels.

Provided that radiation both of the first wavelength and of the second wavelength is coupled into each optical waveguide or radiation both of the first wavelength and of the second wavelength is coupled out from each optical waveguide. The invention enables multichannel transmission or reception operation via a plurality of separate optical waveguides in wavelength division multiplex operation.

In a preferred, particularly compact refinement of the invention, it is provided that at least one of the reflecting surfaces disposed parallel reflects radiation having the first light wavelength and transmits radiation having the second light wavelength.

With regard to the orientation and mounting, further advantages are afforded in a refinement of the assembly according to the invention in which the optical axes of the transducers, on the one hand, and the optical axes of the optical waveguides, on the other hand, are at right angles to one another, and that the transducers run in parallel rows.

Particularly effective coupling with a high coupling efficiency between the optical waveguides and the assigned transducers can be achieved, according to a preferred development of the invention, by virtue of the fact that the deflection device has beam-shaping elements on at least one coupling surface facing the transducers or the optical waveguides.

Other features which are considered as characteristic for the invention are set forth in the appended claims.

Although the invention is illustrated and described herein as embodied in a multichannel electro-optical assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
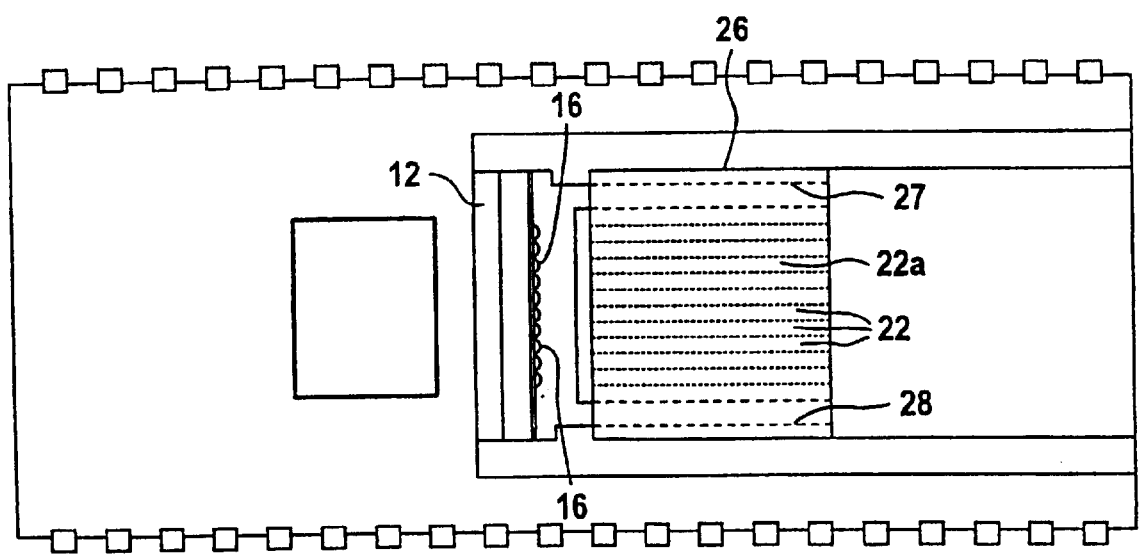
FIG. 1 is a diagrammatic, plan view of an assembly according to the invention.
Figure 2:
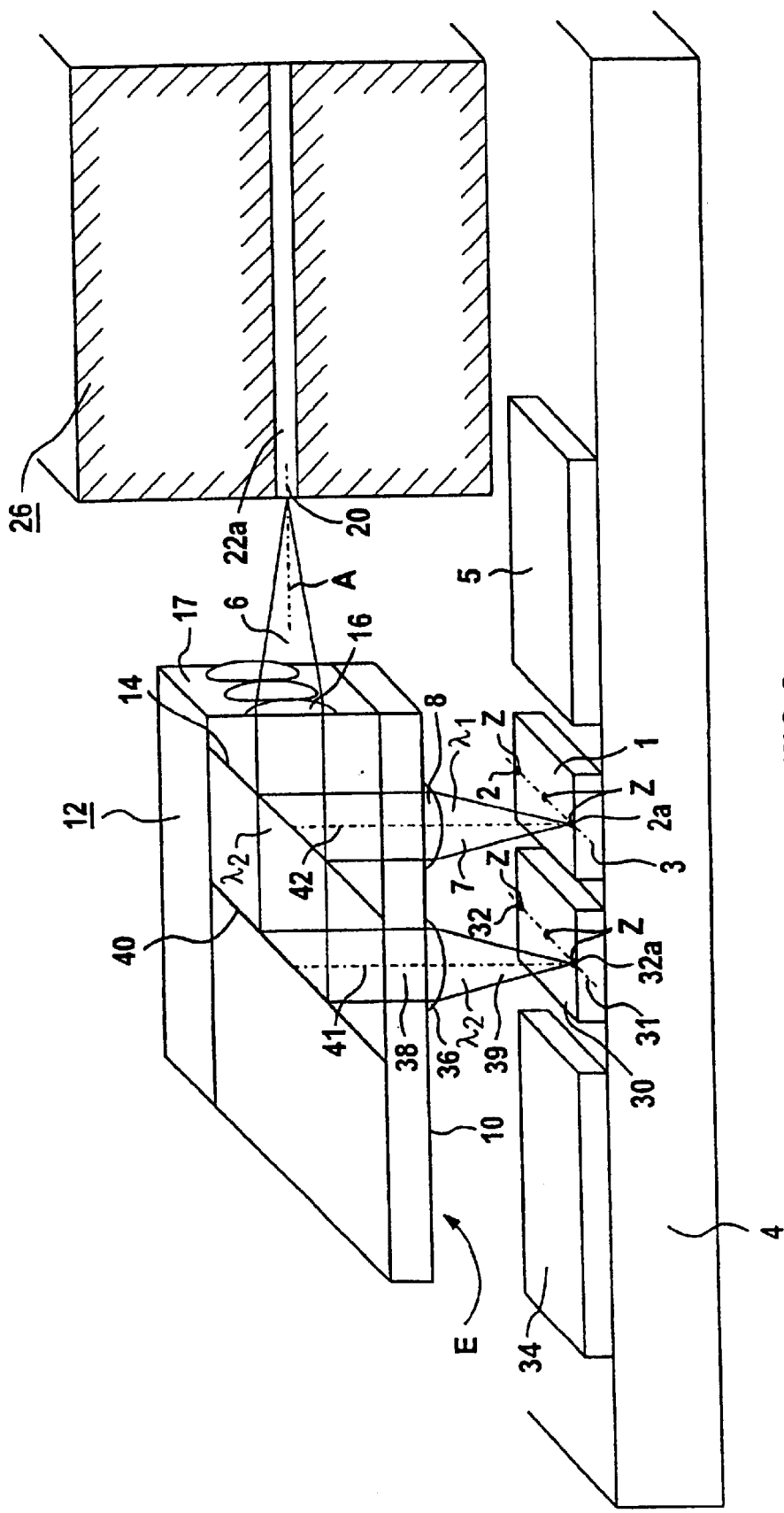
FIG. 2 is an enlarged, perspective view of a longitudinal section through the assembly shown in FIG. 1.

In all the figures of the drawing, sub-features and integral parts that correspond to one another bear the same reference symbol in each case. Referring now to the figures of the drawing in detail and first, particularly, to FIGS. 1 and 2 thereof, there is shown a multichannel assembly containing a first chip 1 with a plurality (for example, 10) of electro-optical transducers 2 disposed in a row 3. In order to simplify the illustration, only optically active zones Z of three transducers 2 are indicated as dots in the perspective view of FIG. 2. The chip 1 is a transducer array 1 that is disposed on a support board 4 in direct proximity to a drive circuit 5 indicated only diagrammatically. In accordance with their electrical driving by the drive circuit 5, the electro-optical transducers 2 convert electrical signals into light signals which are emitted vertically upward from the optically active zones Z. A beam path 6 of a transducer 2a located in the sectional plane E is illustrated by way of example in FIG. 2. Radiation 7 emitted vertically upward passes via a beam-shaping element in the form of a lens 8 on a coupling surface 10—facing the transducer 2a—of a deflection device 12 to a wavelength-selectively reflective surface 14. The reflecting surface 14 may be configured as a dielectric mirror layer and acts in a reflecting manner for the radiation 7 emitted by the transducer 2a and has a wavelength of $\lambda_1=980$ nm, and be transmissive for radiation having a second wavelength of, for example, $\lambda_2=850$ nm. The radiation 7 reflected at the surface 14 passes via a further lens 16 on a further coupling surface 17 into a light-guiding core 20 of an assigned optical waveguide 22a.

The optical waveguide 22a is contained with further optical waveguides 22 in an adapter or connection plug 26. The connection plug 26 contains orienting holes 27, 28 (FIG. 1), which are hinted at in the illustration and into which orienting pins of a coupling partner can penetrate. The optical waveguides 22a, 22, of which there are a total of ten, for example, are thus part of an adapter to which optical waveguides serving for the actual remote transmission, or other coupling partners, can be optically coupled. In principle, it is also conceivable for the adapter 26 to be configured such that it can be detached and separated from the deflection configuration and can be coupled only as required. However, this imposes more stringent requirements on the reproducibility of the coupling conditions.

The transducer array 1 may have a number of transducers 2 corresponding to the number of optical waveguides 22a, 22; however, it may also have more transducers, the excess transducers serving for example for monitoring or power control of the transducer array 1.

Disposed on the support board 4 is a further chip or transducer array 30, which contains electro-optical transducers 32 formed in a row 31. For illustration purposes, the optically active zones Z of the transducers 32 are also represented as dots. A further drive circuit 34 is disposed in direct proximity to the further transducer array 30, which drive circuit 34, when acted on electrically in an appropriate manner, outputs drive pulses to the individual transducers 32 and thereby causes the latter to emit radiation. A lens 36 formed on the coupling surface 10 is in each case assigned to the further transducers 32. As illustrated by the beam path 38, shown by way of example only for the transducer 32a located in the sectional plane E, radiation 39 emitted by the transducer 32a and having a second wavelength $\lambda_2$ which is different from the first wavelength $\lambda_1$, passes via the lens 36 to a second reflecting surface 40. The second reflecting surface 40 is configured parallel to the first reflecting surface 14 and inclined at an angle of 45° with respect to optical axes 41 of the transducers 32 and with respect to optical axes 42 of the transducers 2 or with respect to the optical axes A of the optical waveguides 22a, 22. Radiation 39 emitted by the transducer 32a passes by reflection at the surface 40 onto a rear side of the surface 14, which is transmissive for the wavelength $\lambda_2$ (of 850 nm, for example) emitted by the transducer 32a. Consequently, the radiation passes via the lens 16, likewise into the light-guiding core 20 of the same optical waveguide 22.

The second row 31 of further transducers 32 may likewise contain e.g. ten or more transducers, in which case the excess transducers 32 in relation to the number of optical waveguides may serve for the purpose of power control or monitoring of the transducer array 30.

A significant capacity increase or space reduction is achieved with the assembly according to the invention in that multichannel operation can simultaneously be carried out via a plurality of separate transmission channels (individual optical waveguides) in wavelength division multiplex operation.

Preferably, radiations of different wavelengths, rather than just radiation of a single wavelength, are transmitted via each of the optical waveguides 22. In the context of the exemplary embodiment, although only the transmission of radiations of two different wavelengths per optical waveguide (for example at 980 nm and 850 nm) is mentioned, it is nonetheless possible, of course, with further cascading, to provide further rows of transducers with differing wavelengths (e.g. 880 nm, 920 nm). In the case of the assembly according to the invention, the superposition of radiations of different wavelengths is realized with the aid of the deflection device 12 in an extremely simple manner by one of the deflection mirrors effecting wavelength selective reflection.

In the same way, it is also possible to realize mixed forms of assemblies that contain both transmitting and receiving electro-optical transducers. In an analogous manner to the configuration illustrated, it is possible to realize a multichannel electro-optical assembly for receiving superposed data signals. In this case, the arrays 1, 30 would have to be configured as receiver arrays and would have applied to them, via the wavelength-selective mirror 14, signals of different and hence differentiable wavelengths, the signals in each case emerging from an optical waveguide 22.

I claim:

1. A multichannel electro-optical assembly, comprising:

a first array having electro-optical transducers for electro-optical conversion of radiation having a first light wavelength;

at least one second array having electro-optical transducers for electro-optical conversion of radiation having at least one second light wavelength being different from the first light wavelength, said at least one second array disposed parallel to said first array;

a plurality of optical waveguides; and a deflection device for optically coupling in each case one of said electro-optical transducers of said first array and of said at least one second array to one of said optical waveguides, said deflection device having at least two reflecting surfaces disposed parallel to one another and each of said two reflecting surfaces associated respectively with one of said first array and said at least one second array so that into each of said optical waveguides the radiation of the first wavelength and the radiation of the second wavelength is able to be coupled in or out or radiation of the first wavelength is coupled in and radiation of the second wavelength is coupled out.

2. The assembly according to claim 1, wherein at least one of said two reflecting surfaces reflects the radiation having the first light wavelength and transmits the radiation having the second light wavelength.

3. The assembly according to claim 1, wherein said electro-optical transducers of said first array and said at least one second array have first optical axes and said optical waveguides have second optical axes which are at right angles to said first optical axes.

4. The assembly according to claim 1, wherein:

said deflection device has at least one coupling surface facing said electro-optical transducers of said first array and said at least one second array; and said deflection device has beam-shaping elements disposed on said at least one coupling surface.

5. The assembly according to claim 1, wherein:

said deflection device has at least one coupling surface facing said optical waveguides; and said deflection device has beam-shaping elements disposed on said at least one coupling surface.

\* \* \* \* \*